US007278262B2

(12) United States Patent
Moon

(10) Patent No.: US 7,278,262 B2
(45) Date of Patent: Oct. 9, 2007

(54) CONTROL SYSTEM FOR SUPPRESSION OF BOOM OR ARM OSCILLATION

(75) Inventor: Kee Moon, San Diego, CA (US)

(73) Assignee: Board of Control of Michigan Technological University, Houghton, MI (US)

( * ) Notice: Subject to any disclaimer, the term of this patent is extended or adjusted under 35 U.S.C. 154(b) by 155 days.

(21) Appl. No.: 11/224,258

(22) Filed: Sep. 12, 2005

(65) Prior Publication Data

US 2006/0272325 A1 Dec. 7, 2006

Related U.S. Application Data

(60) Provisional application No. 60/687,077, filed on Jun. 3, 2005.

(51) Int. Cl.
*F16D 31/02* (2006.01)
*F15B 13/04* (2006.01)

(52) U.S. Cl. ............................ 60/469; 60/426; 91/461

(58) Field of Classification Search .................. 60/426, 60/469; 91/433, 461; 700/280
See application file for complete search history.

(56) References Cited

U.S. PATENT DOCUMENTS

| | | | | |
|---|---|---|---|---|
| 4,586,332 | A | | 5/1986 | Schexnayder |
| 4,718,329 | A | | 1/1988 | Nakajima et al. |
| 4,863,337 | A | | 9/1989 | Ishiguro et al. |
| 5,048,296 | A | | 9/1991 | Sunamura et al. |
| 5,540,049 | A | | 7/1996 | Lunzman |
| 5,832,730 | A | * | 11/1998 | Mizui .......................... 60/469 |
| 5,873,245 | A | | 2/1999 | Kato et al. |
| 5,887,390 | A | | 3/1999 | Schulz et al. |
| 6,354,790 | B1 | | 3/2002 | Cummings et al. |
| 6,408,622 | B1 | | 6/2002 | Tsuruga et al. |
| 6,422,804 | B1 | | 7/2002 | Gitter |
| 6,474,064 | B1 | | 11/2002 | Heyne et al. |
| 6,520,731 | B2 | | 2/2003 | MacLeod |
| 6,532,738 | B2 | | 3/2003 | Sharkness et al. |
| 6,553,278 | B2 | | 4/2003 | Handroos et al. |
| 6,640,409 | B2 | | 11/2003 | Sharkness et al. |
| 6,647,721 | B2 | | 11/2003 | Heyne et al. |
| 6,666,125 | B2 | | 12/2003 | Gunzenhauser |
| 6,705,079 | B1 | | 3/2004 | Tabor et al. |
| 6,883,532 | B2 | * | 4/2005 | Rau ............................ 91/361 |
| 6,941,687 | B2 | | 9/2005 | Sharkness et al. |
| 7,032,332 | B2 | | 4/2006 | Sharkness et al. |

* cited by examiner

*Primary Examiner*—Michael Leslie
(74) *Attorney, Agent, or Firm*—Michael Best & Friedrich LLP

(57) ABSTRACT

A control for a working apparatus having a boom arm. The apparatus includes a controller operable to receive signals from at least one pressure sensor. The at least one pressure sensor detects pressure of hydraulic fluid in at least one chamber of a control valve. The controller compares the signals from the at least one pressure sensor to parameters generated by testing the working apparatus. The controller predicts boom arm oscillations based on the comparison of the signals with the parameters, and generates a control signal in response to predicting the boom arm oscillations.

31 Claims, 9 Drawing Sheets

CONTROL SYSTEM FOR SUPPRESSION OF BOOM OR ARM OSCILLATION

PRIORITY CLAIM

This application claims priority under 35 USC 119(e) to U.S. Provisional Patent Application No. 60/687,077 filed Jun. 3, 2005.

BACKGROUND

The present invention relates to a control system for suppression of boom oscillations affecting a working apparatus.

SUMMARY

In one embodiment, the invention provides a working apparatus having a first source of pressurized hydraulic fluid; an operator control unit; a boom arm; a boom cylinder coupled to the boom arm, the cylinder having a first chamber and a second chamber; a main control valve selectively directing pressurized hydraulic fluid from the first source to the first and second chambers in response to manipulation of the operator control unit to selectively raise and lower the arm; a first pressure sensor and a second pressure sensor detecting hydraulic pressure in the first and second chambers, respectively, and generating signals in reference to the amount of hydraulic pressure in the first and second chambers, respectively; and a controller receiving the signals from the pressure sensors, processing the signals to predict boom oscillations, and operating the main control valve to help prevent the predicted boom oscillations.

In another embodiment, the invention provides a working apparatus having a first source of pressurized hydraulic fluid; an operator control unit; a boom arm; a boom cylinder coupled to the boom arm; the cylinder having a first chamber and a second chamber; a main control valve selectively directing pressurized hydraulic fluid from the first source to the first and second chambers in response to manipulation of the operator control unit to selectively raise and lower the arm; a first pressure sensor and a second pressure sensor detecting hydraulic pressure in the first and second chambers, respectively, and generating signals in reference to the amount of hydraulic pressure in the first and second chambers, respectively; a controller receiving the signals from the pressure sensors, processing the signals to monitor operation of the cylinder and arm, and generating a control signal when the signals are indicative of impending boom oscillations; and a controller valve overriding the operator control unit and manipulating the main control valve to help prevent boom oscillations in response to receiving the control signal.

In another embodiment, the invention provides a method of inhibiting boom oscillations in a working apparatus having a boom arm coupled to a boom cylinder having first and second chambers, a main control valve, and an operator control unit permitting an operator to manipulate the main control valve to direct hydraulic fluid into one of the first and second chambers to selectively raise and lower the arm. The method comprises (a) detecting pressure of hydraulic fluid in the first and second chambers of the boom cylinder; (b) generating first and second chamber signals in reference to the hydraulic pressure in the first and second chambers, respectively; (c) comparing the first and second chamber signals to parameters; (d) predicting boom oscillations based on the comparison of step (c); (e) generating a control signal in response to predicting boom oscillations; and (f) overriding operation of the control unit to manipulate the main control valve and help prevent predicted boom oscillations in response to creating the control signal.

In another embodiment, the invention provides a control for a working apparatus having an arm, the control including a controller operable to receive at least one signal from a first pressure sensor that is operable to detect a pressure in a first chamber of a control valve, and at least one signal from a second pressure sensor that is operable to detect a pressure in a second chamber of the control valve, wherein the controller is operable to process the at least one signal from each of the first and second sensors, and to control the control valve to help prevent oscillations of the arm.

In another embodiment, the invention provides a method for inhibiting arm oscillations in an apparatus having an arm, the method including generating a first signal indicative of pressure in a first chamber; generating a second signal indicative of pressure in a second chamber; comparing the first signal to the second signal; predicting arm oscillations based on the comparison of the first signal to the second signal; and generating a control signal in response to predicting the arm oscillations.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “mounted,” “connected,” “supported,” and "coupled" and variations thereof are used broadly and encompass both direct and indirect mountings, connections, supports, and couplings, respectively. Further, "connected" and "coupled" are not restricted to physical or mechanical connections or couplings.

Figure 1:
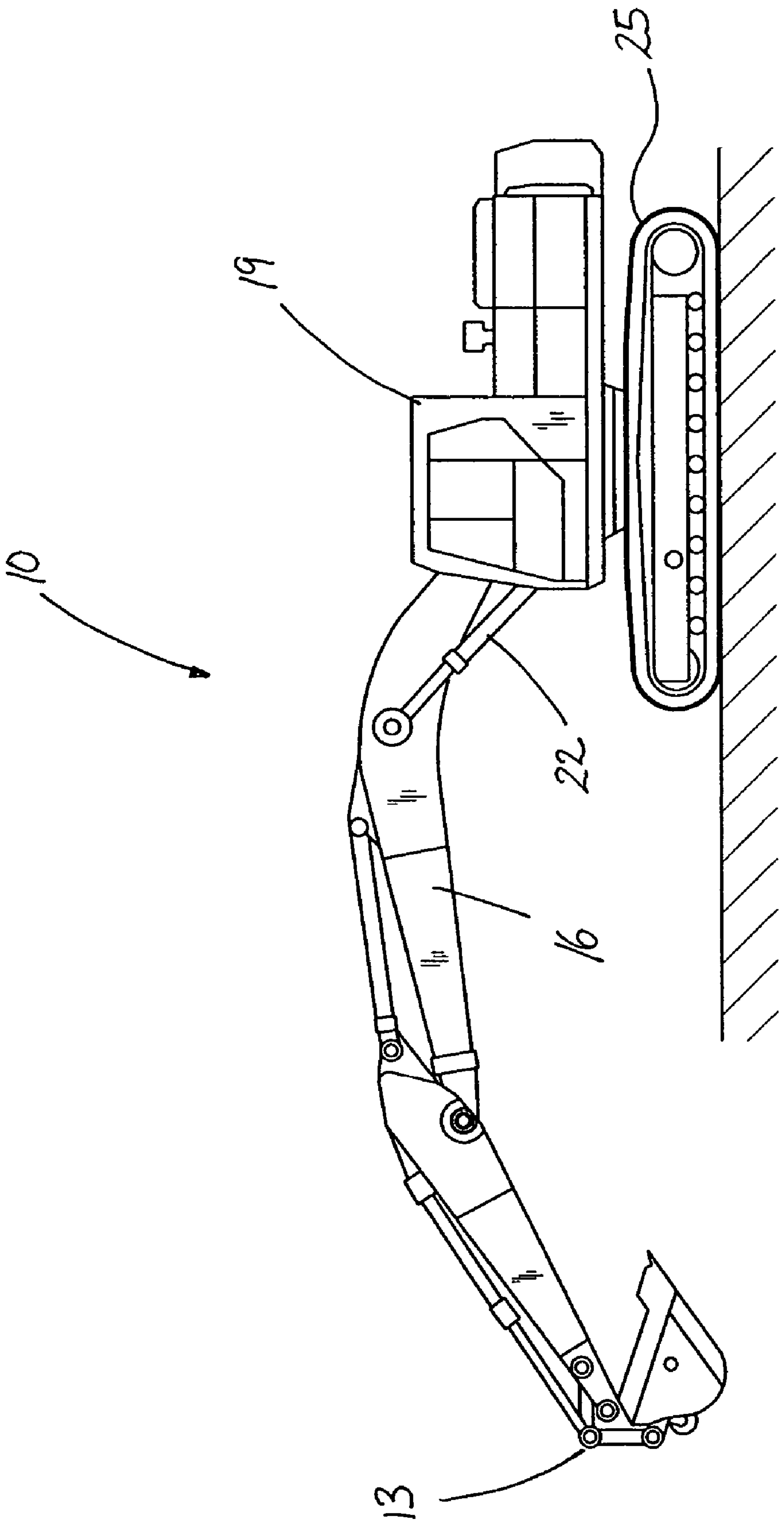
FIG. 1 illustrates a working apparatus.

FIG. 1 illustrates a working apparatus 10 in the form of an excavator comprising an arm and bucket assembly 13, a boom arm 16 connected to the assembly 13 at one end and to a control station 19 at the opposite end, a boom cylinder 22 coupled to the boom arm 16, and tracks 25 supporting the control station 19. The excavator 10 also includes a hydraulic system 28 operating the boom cylinder 22, and a control system 31 coupled to the hydraulic system 28 (better illustrated in FIGS. 2-4). The arm and bucket assembly 13 is connected to the control station 19, and it is operable to collect and transport dirt or other materials. The boom cylinder 22 selectively raises and lowers the boom arm 16 in response to manipulation of the hydraulic system 28 operated from the control station 19. The arm and bucket assembly 13 raises and lowers material as a consequence of raising and lowering the boom arm 16. The control station 19 is operable to rotate above the tracks 25 supporting the control station 19 to transport material to a location within the same radius defined by the distance between the control station 19 and the assembly 13.

The excavator 10 may experience oscillations, particularly boom oscillations, as a result of operating the boom arm 16 with the boom cylinder 22. An operator in the control station 19 manipulates the hydraulic system 28 to operate the boom cylinder 22 raising and lowering the boom arm 16. The inertial force of the boom arm 16 and the assembly 13 produced by the boom arm 16 rapidly ceasing motion or changing direction, can cause boom oscillations that affect the excavator 10. The control system 31 coupled to the hydraulic system 28 is operable to predict oscillations and operate the hydraulic system 28 to help prevent the boom oscillations from occurring. In alternate embodiments, the control system may be used in different machines. For example, the control system 31 may by used in robots. Robotic arms may include a hydraulic system to raise and lower an end effector in a manner similar to the excavator 10. Thus, it is to be understood that the control system is not restricted to excavators 10 and that the invention may encompass implementing the control system in other devices.

Figure 2:
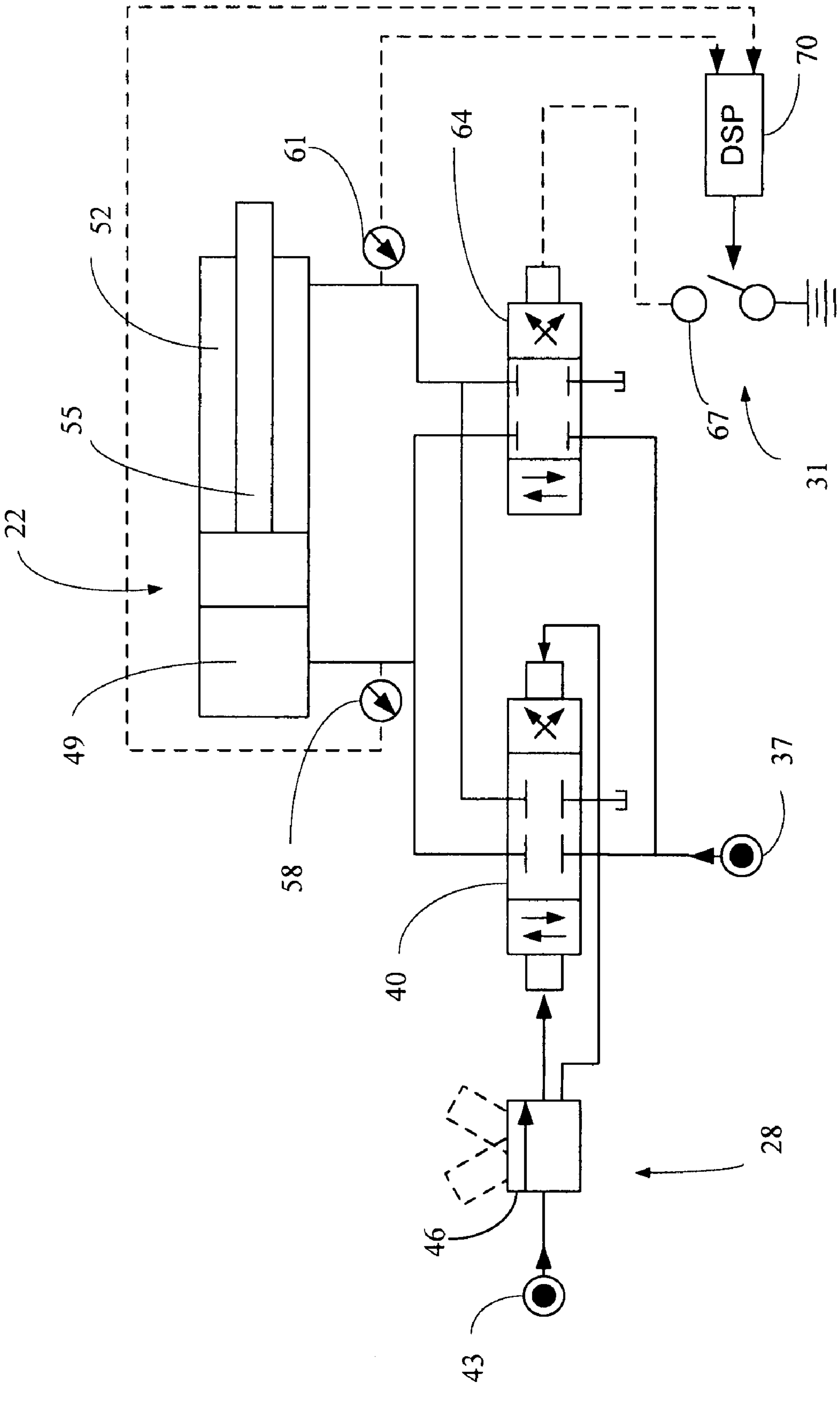
FIG. 2 is a schematic representation of a hydraulic system and a control system overriding the operation of a master control valve.

FIG. 2 illustrates the hydraulic system 28 and the control system 31 in one embodiment of the invention. The hydraulic system 28 includes a main source of pressurized hydraulic fluid 37 hydraulically connected to a master control valve ("MCV") 40, and a pilot source 43 of hydraulic fluid hydraulically connected to a control lever 46. It is to be understood that the control lever may include devices such as a joystick. The boom cylinder 22 schematically represented in FIGS. 2-4 includes a first chamber 49, a second chamber 52, and a piston 55 separating the first and second chambers 49 and 52, and coupling the cylinder 22 to the boom arm 16, illustrated in FIG. 1. The operator manipulates the control lever 46 to direct hydraulic fluid from the pilot source 43 to one end or the other of the MCV 40 to shift the MCV 40. If the MCV 40 is shifted one way, it directs hydraulic fluid from the main source 37 into the first chamber 49, which increases pressure in the first chamber 49. A decrease in hydraulic pressure in the second chamber 52 is caused simultaneously by decreasing hydraulic fluid in the second chamber 52 thus moving the piston 55 to raise the boom arm 16. Alternatively, if the MCV 40 is shifted in another way, it directs hydraulic fluid from the main source 37 to the second chamber 52, thus increasing pressure in the second chamber 52 and decreasing pressure in the first chamber 49 to lower the boom arm 16.

The control system 31 comprises a first pressure sensor 58, a second pressure sensor 61, a controller valve 64, a relay switch 67, and a controller 70, such as a digital signal processor, microprocessor, or other device. The first and second pressure sensors 58 and 61 detect hydraulic pressure, and generate signals representative of the hydraulic pressure in the first and second chambers 49 and 52, respectively. The controller 70 receives the signals generated by the first and second sensors 58 and 61, and processes the signals to predict boom oscillations. The operator in the control station 19 selectively opens or closes the relay switch 67 connecting the controller 70 and the controller valve 64 to disable or enable the control system 31, respectively. The controller 70 sends a control signal to the controller valve 64 generated in response to predicting boom oscillations when the relay switch 67 is in a closed position. The controller valve 64, illustrated in FIG. 2, is in a parallel configuration with the MCV 40, and hydraulically connects the main source 37 to the boom cylinder 22 along a path independent of the MCV 40. In response to receiving the control signal, the controller valve 64 directs hydraulic fluid between the main source 37 and the first and second chambers 49 and 52, overriding the operation of the MCV 40 to prevent oscillations.

Figure 3:
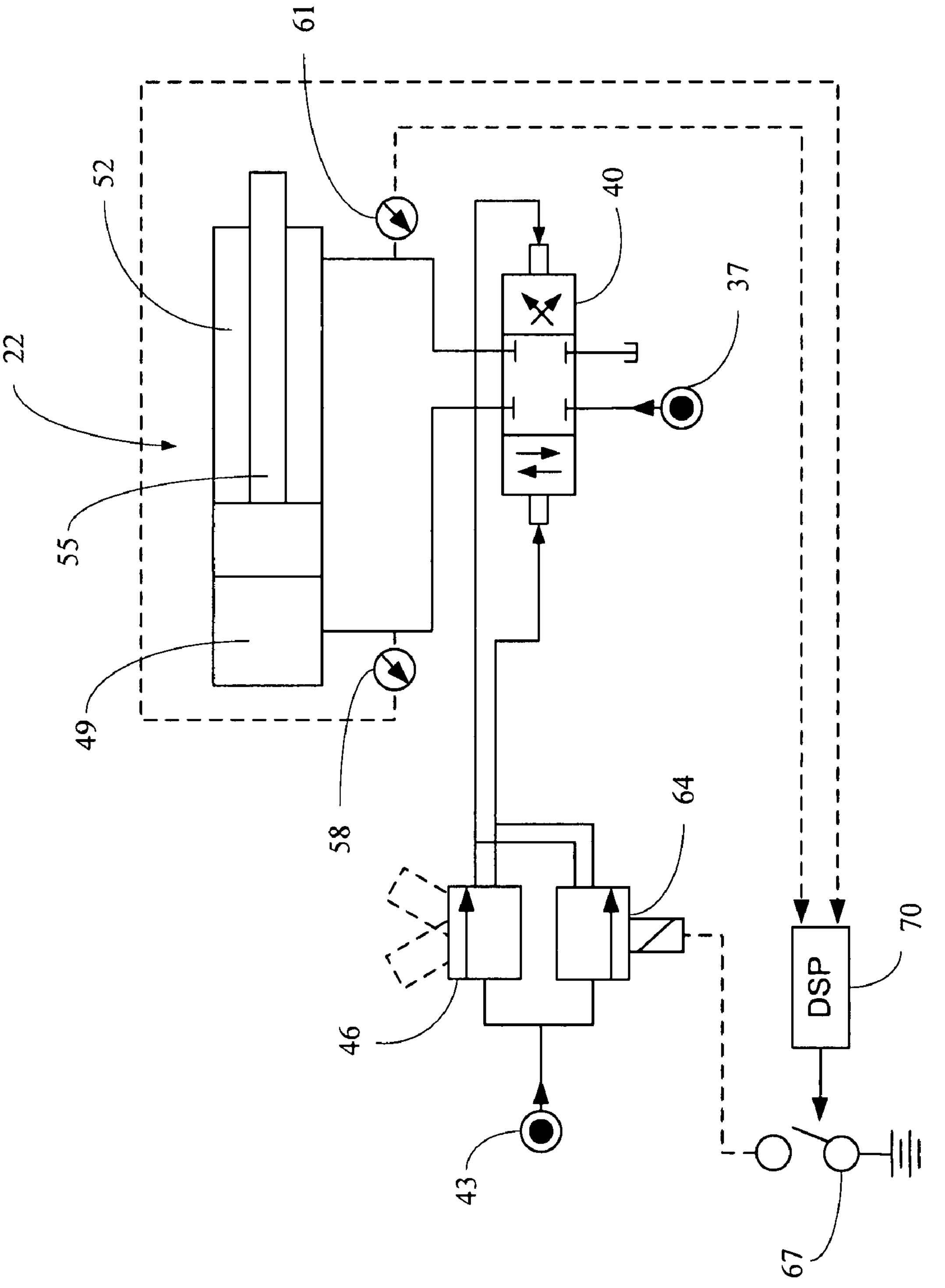
FIG. 3 is a schematic representation of the hydraulic system and the control system overriding the operation of a control lever.

FIG. 3 illustrates the hydraulic system 28 and the control system 31 in an alternate configuration. The controller valve 64 is in a parallel configuration with the control lever 46. In response to receiving the control signal, the controller valve 64 overrides the operation of the control lever 46, and directs hydraulic fluid between the pilot source 43 and the MCV 40 to manipulate the MCV 40. For example, the operator can manipulate the control lever 46 to increase pressure in the first chamber 49 and lower pressure in the second chamber 52, thus raising the boom arm 16. The operator may rapidly cease or reverse motion of the boom arm 16. This causes a change of pressure in the first and second chambers 49 and 52 that is detected by the first and second sensors 58 and 61, respectively. The controller 70 generates the control signal in response to predicting the boom oscillations, causing the controller valve 64 to operate the MCV 40. The controller valve 64 operates the MCV 40. The MCV 40 directs hydraulic fluid between the main source 37 and the first and second chambers 49 and 52 in a manner to substantially prevent or help prevent the predicted boom oscillations.

Figure 4:
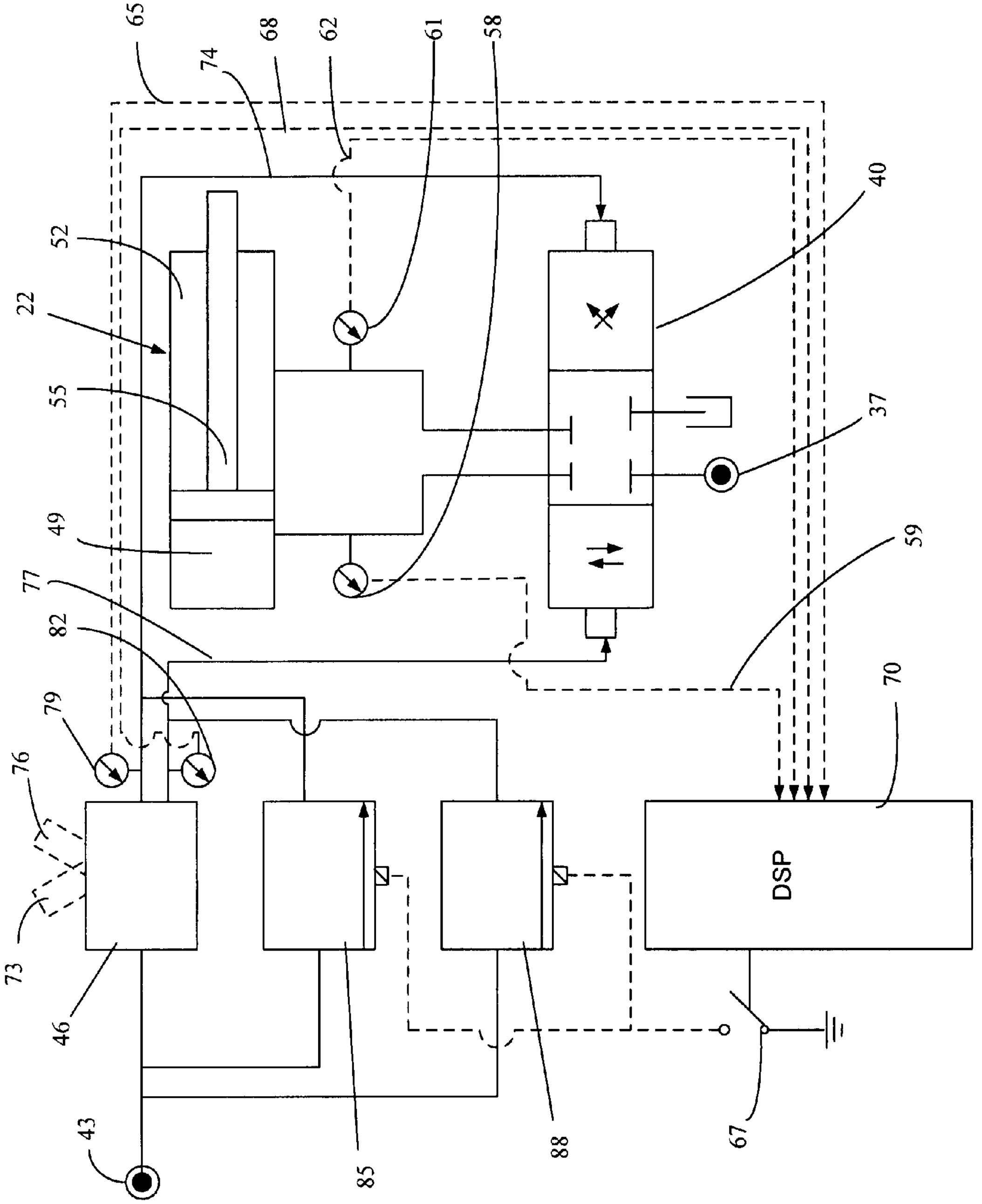
FIG. 4 is a schematic representation of the hydraulic system and the control system overriding the operation of the control lever with two controller valves.

FIG. 4 illustrates the control lever 46 and two positions between which the lever 46 can be moved: a first position 73 and a second position 76. Hydraulic fluid flows through line 74 when the control lever 46 is in the first position 73. When the control lever 46 is in the second position 76, hydraulic fluid flows through line 77. The operator may manipulate the control lever 46 to the first position 73 to shift the MCV 40 under the influence of the pilot source 43. As a consequence, hydraulic fluid is directed from the main pressure source 37 into the second chamber 52 and out of the first chamber 49, lowering the boom arm 16. Similarly, the operator may manipulate the control lever 46 to the second position 76 to shift the MCV 40 under the influence of the pilot source 43. As a consequence, hydraulic fluid is directed from the main pressure source 37 into the first chamber 49 and out of the second chamber 52, raising the boom arm 16.

As illustrated in FIG. 4, the control system 31 includes a third pressure sensor 79 configured to detect hydraulic pressure between the control lever 46 and the MCV 40 when the control lever 46 is in the first position 73, a fourth pressure sensor 82 configured to detect hydraulic pressure between the control lever 46 and the MCV 40 when the control lever 46 is in the second position 76, a first controller valve 85 operable to override the control lever 46 when it is in the first position 73, and a second controller valve 88 operable to override the control lever 46 when it is in the second position 76. The controller 70 receives signals from the first, second, third, and fourth pressure sensors 58, 61, 79, and 82 through lines 59, 62, 80, and 83, respectively, to predict boom oscillations. The controller 70 uses these signals and parameters that take into account the physical characteristics of the excavator 10 to predict the boom oscillations.

In certain embodiments, the controller 70 identifies two cases in which the operation of the boom cylinder 22 causes boom oscillations. The identification is made based on the detected pressures in the first and second chambers 49 and 52. The pressure reading from the first pressure sensor 58 ("S1") and the pressure reading from the second pressure sensor 61 ("S2") are compared to a first parameter ("C1") and a second parameter ("C2") to determine cases (which on one embodiment are case 1 and case 2) when operating the hydraulic system 28 causes boom oscillations. In case 1, the value of S2 is subtracted from S1(S1–S2) and the difference is compared to C1. If the difference is less than C1, it is assumed that the boom arm 16 has been raised and rapidly stopped or reversed in direction. In case 2, the difference S1–S2 is compared to C2. If the difference is greater than C2, it is assumed that the boom arm 16 has been lowered and rapidly stopped or reversed in direction. The controller 70 generates the control signal when cases 1 and 2 are identified. Thus, the controller valve 64 overrides the operation of the MCV 40 (illustrated in FIG. 2) or the control lever 46 (illustrated in FIG. 3) to ultimately direct hydraulic fluid between the main pressure source 37 and the boom cylinder 22 to help prevent boom oscillations.

The control signal is generated until the difference of S1–S2 is greater than C1 and less than C2. The values C1 and C2 can be determined by following a testing procedure. The testing procedure can be conformed to a particular type of excavator 10, and may include deliberately causing boom oscillations and measuring the pressure in the first and second chambers 49 and 52. A first testing procedure may include raising and stopping the boom arm. This causes a rapid drop of pressure in the first chamber 49 and a rapid increase of pressure in the second chamber 52. A second testing procedure may include lowering and stopping the boom arm. This causes a rapid increase of pressure in the first chamber 49 and a rapid decrease of pressure in the second chamber 52. In particular, the first testing procedure indicates that boom oscillations may occur when the difference S1–S2 is less than a first critical value. In addition, the second testing procedure indicates that boom oscillations may occur when the difference S1–S2 is greater than a second critical value. Thus, the first and second testing procedures help determining the values of C1 and C2, respectively. The first and second testing procedures usually yield different values of C1 and C2 based of the type of excavator 10 being tested. However, the values of C1 and C2 are generally constant for excavators 10 of the same type.

Figure 5:
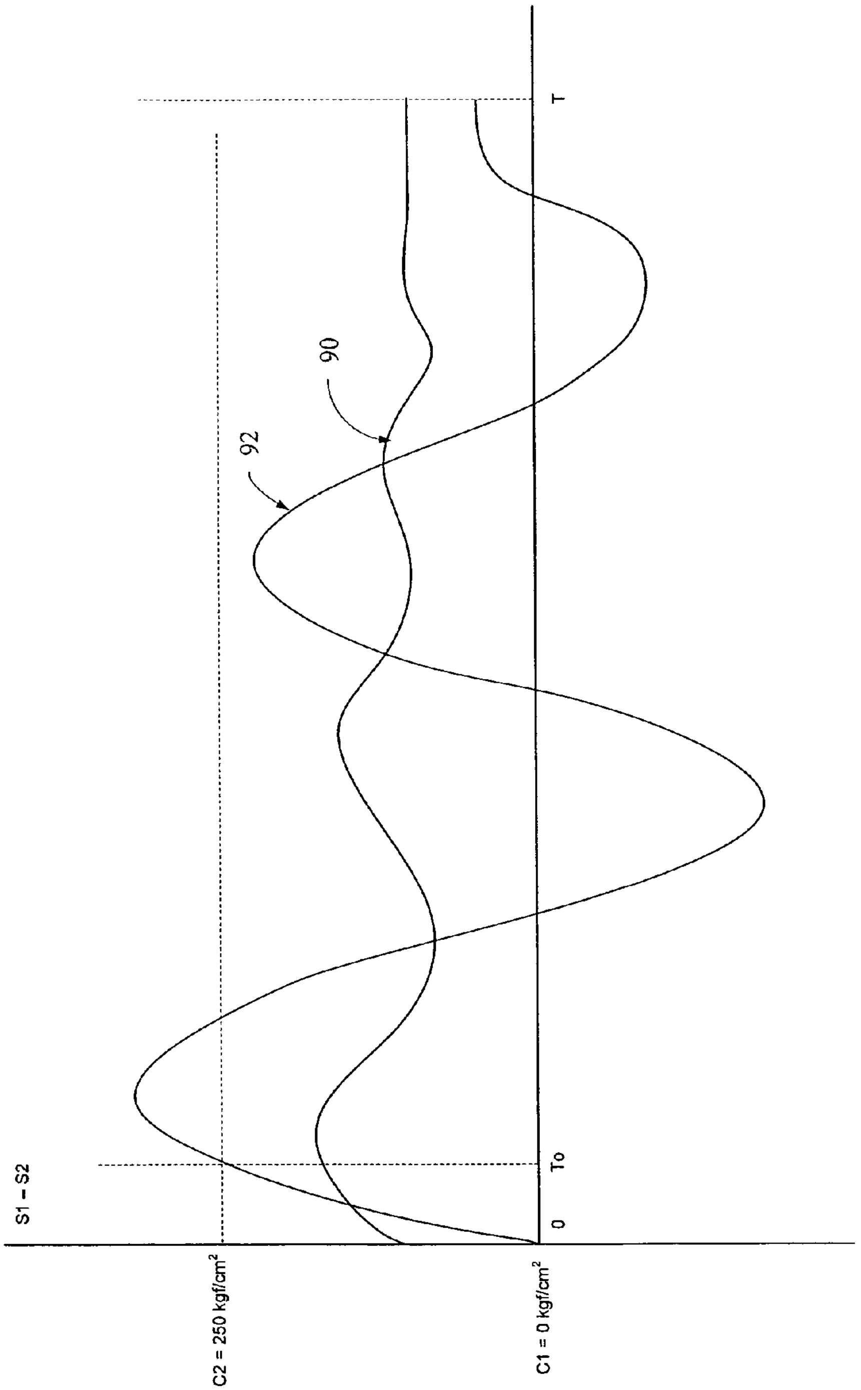
FIG. 5 is a pressure vs. time graph illustrating two boom oscillations in terms of a difference of two pressure values S1–S2.

Alternatively, the operator can modify the values of C1 and C2 to accommodate for an individual manner of operating the excavator 10. For example, FIG. 5 illustrates a pressure vs. time graph indicating the critical values C1=0 $kgf/cm^2$ and C2=250 $kgf/cm^2$, a first pressure profile 90 and a second pressure profile 92, over a period of time from 0 to T. The first and second pressure profiles 90 and 92 are indicative of the difference S1–S2 caused by boom oscillations occurring from time 0 to time T. The first pressure profile 90 indicates that the difference S1–S2 is not less than C1 or greater than C2 during the time 0 to T. Thus, the controller 70 does not generate the control signal and it is assumed that the oscillations are acceptable by operator. The second pressure profile 92 indicates that the difference S1–S2 is greater than C2 at time $T_0$. Thus, the controller 70 generates the control signal until the difference S1–S2 is less than C2.

The controller 70 is configured to sense when the operator manipulates the control lever 46 between the first and second positions 73 and 76 based on the pressure readings generated by the fourth pressure sensor 82 ("S3") and the third pressure sensor 79 ("S4"), respectively. The controller 70 generates the control signal when identifying case 1 and a change in the signal S3 or when identifying case 2 and a change in the signal S4. FIGS. 6-9 include flow charts describing one method to predict boom oscillations in reference to the control system 31 illustrated in FIG. 4.

Figure 6:
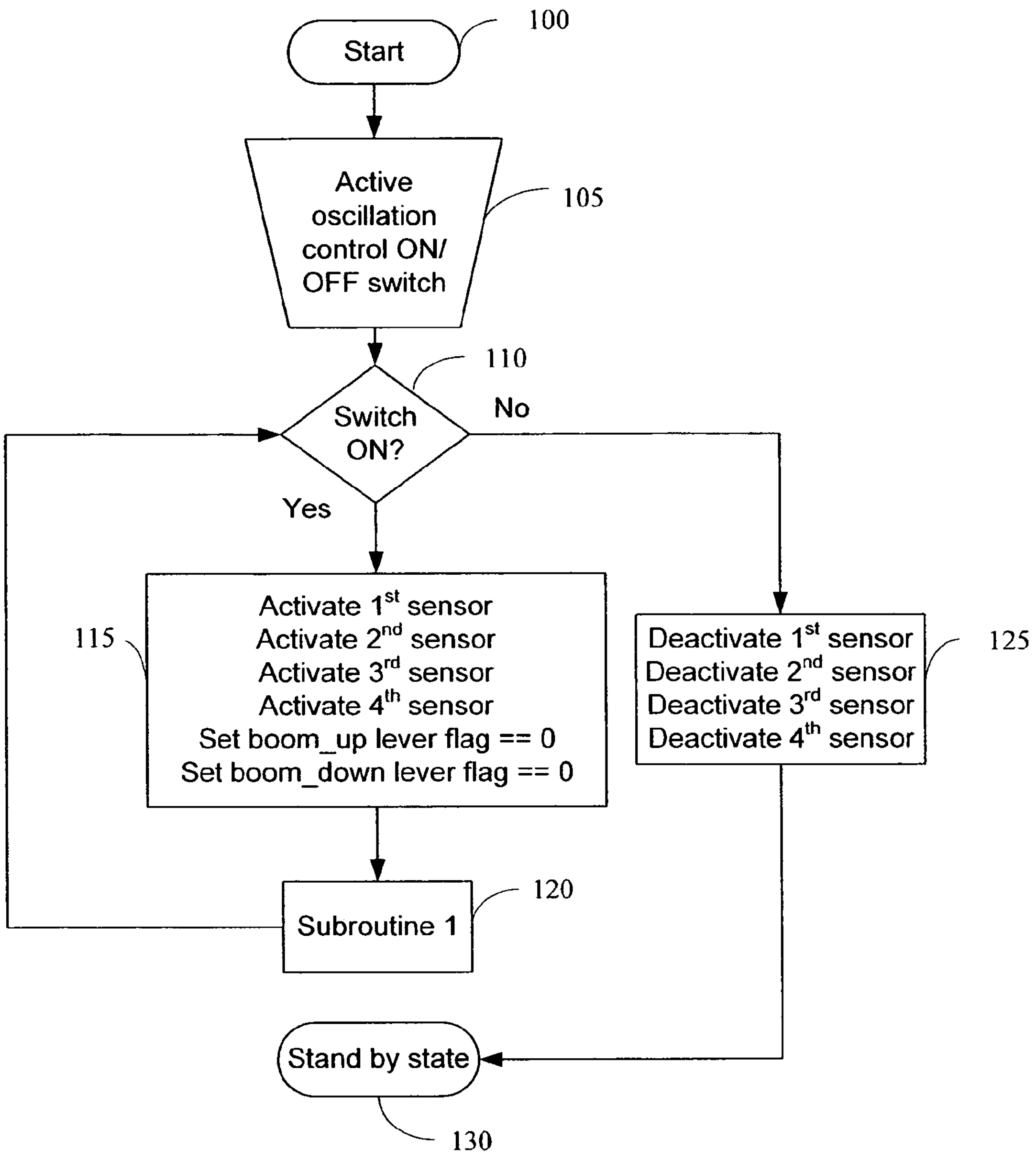
FIG. 6 is a flow chart illustrating processes to enable the control system.

FIG. 6 is a flow chart illustrating processes to initiate the controller 70 and the pressure sensors. The operator starts the excavator 10 (at step 100), and selectively enables the operation of the hydraulic system 28. The operator then turns an on/off switch (illustrated in FIGS. 2-4 as the relay switch 67) to an on position (at step 105), thus enabling the operation of the control system 31. The controller 70 checks the position of the on/off switch (at step 110) and activates the first, second, third, and fourth sensors 58, 61, 79, and 82 (at step 115) to receive signals indicative of the pressure in the first and second chambers 49 and 52, and the pressure between the control lever 46 and the MCV 40. The controller 70 also sets the values of a boom_up lever flag and a boom_down lever flag to 0, and continues to the operations in subroutine 1 (at step 120) illustrated in FIG. 7. The controller 70 checks the on/off switch (at step 110) after completing the operations in subroutine 1 until the operator places the on/off switch in the off position, in which case the controller 70 deactivates the first, second, third, and fourth pressure sensors 58, 61, 79, and 82 (at step 125), and proceeds to a stand-by or off state (at step 130).

Figure 7:
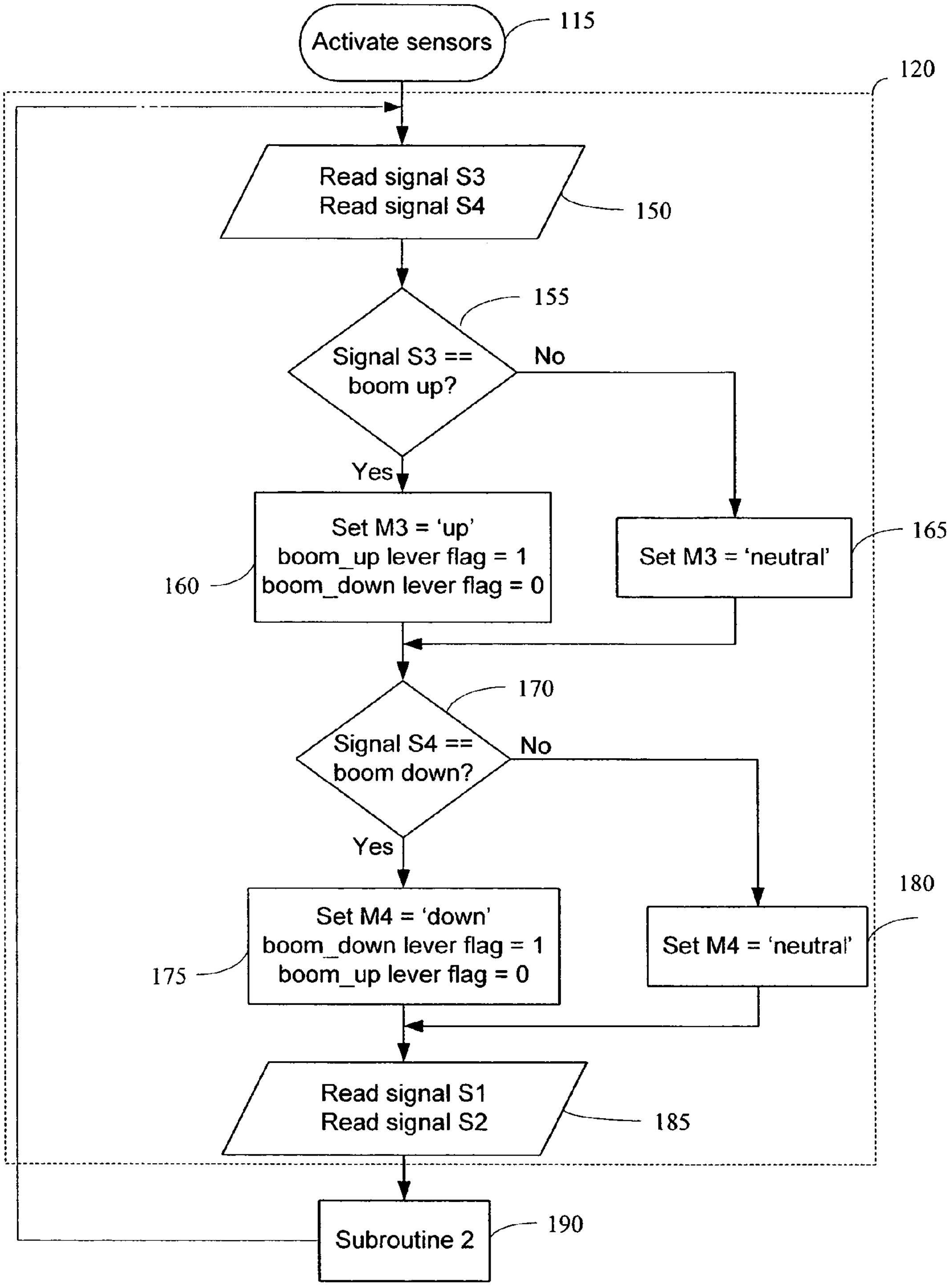
FIG. 7 is a flow chart illustrating processes to detect hydraulic pressure between the control lever and the master control valve.

FIG. 7 illustrates subroutine 1, which describes processes to read the signals S3 and S4, and set the values for the boom_up and boom_down lever flags. After activating the pressure sensors and setting the boom_up and boom_down lever flags to 0 (at step 115), the controller 70 reads the signals S3 and S4 (at step 150). S3 and S4 refer to the hydraulic pressure between the control lever 46 and the MCV 40 when the operator manipulates the control lever 46 between the first ("down") and second ("up") positions 73 and 76. The controller 70 is configured to sense when the operator manipulates the control lever 46 to raise the boom arm 16 (at step 155). As a consequence, the value of a variable M3 is set to 'up', and the values of the boom_up and boom_down lever flags are set to 1 and 0, respectively (at step 160). Alternatively, the value of M3 may be set to 'neutral' (at step 165) indicating a significantly low or non existent signal S3 . The controller 70 then senses when the operator manipulates the control lever 46 to lower the boom arm 16 (at step 170). As a consequence, the value of a variable M4 is set to 'down', and the values of the boom_up and boom_down lever flags are set to 0 and 1, respectively (at step 175). Alternatively, the value of M4 may be set to 'neutral' (at step 180) indicating a significantly low or non existent signal S4. The controller 70 senses the signals S1 and S2 (at step 185), and begins operations described in a subroutine 2 (at step 190). When the subroutine 2 is completed, the controller 70 reads the signals S3 and S4 (at step 150) to update the values of the lever flags, M3, and M4.

Figure 8:
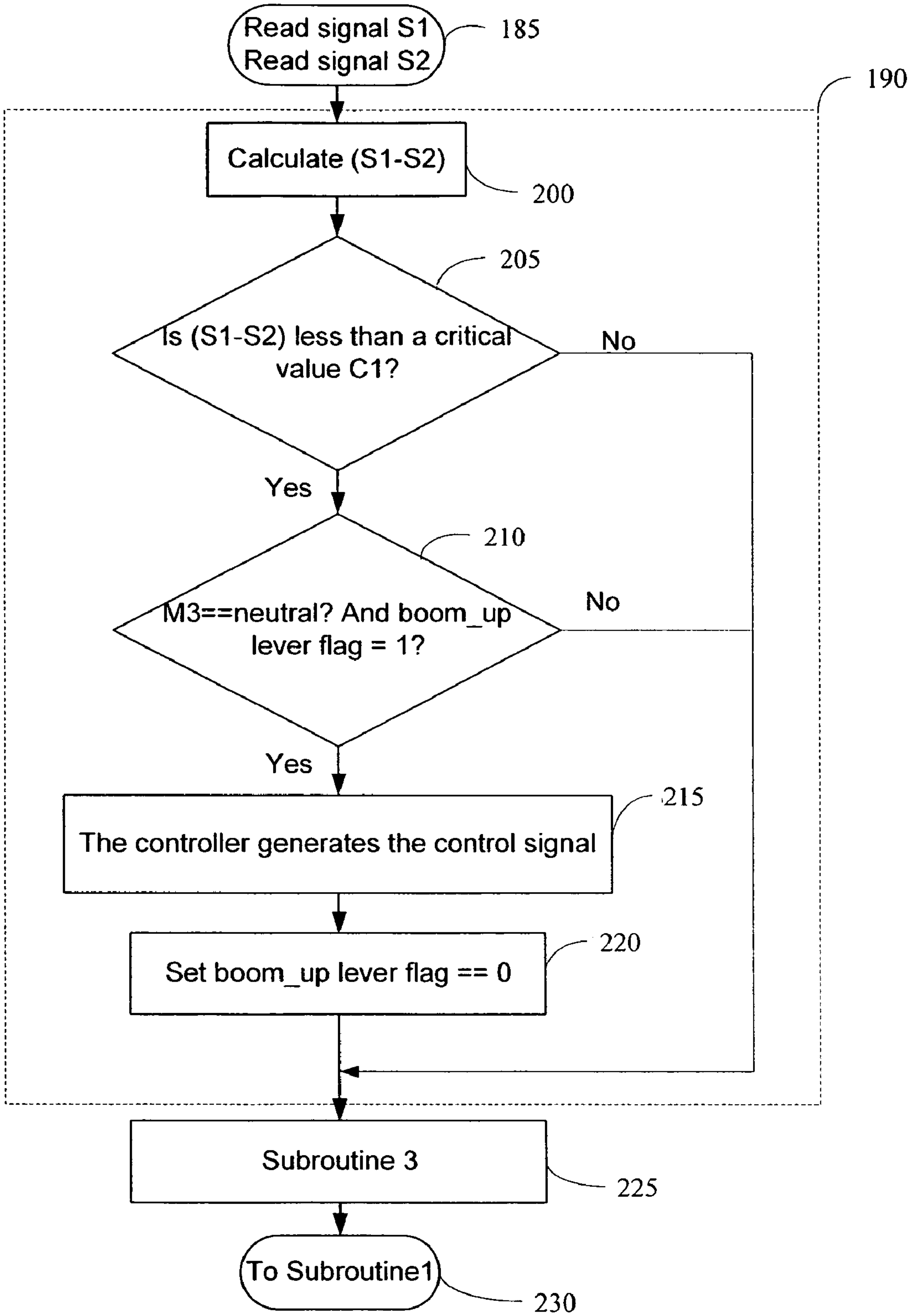
FIG. 8 is a flow chart illustrating processes to identify a first set of conditions related to boom oscillations.

After the controller 70 receives the signals S1 and S2 (at step 185), as illustrated in FIG. 8, the controller 70 subtracts S2 from S1 (at step 200) and compares the difference to C1 to identify case 1 (at step 205). The controller 70 checks the values of M3 and the boom_up lever flag (at step 210). The controller generates the control signal (at step 215) when the values of M3 and the boom_up lever flag are 'neutral' and 1, respectively. The controller 70 sets the boom_up lever flag to 0 (at step 220) and continues to the processes described in a subroutine 3 (at step 225) illustrated in FIG. 9. When the processes of the subroutine 3 are completed, the controller 70 returns to subroutine 1 (at step 230). Alternatively, when conditions are not indicative of case 1 (at step 205), the controller 70 proceeds to the processes described in subroutine 3. Additionally, when case 1 is identified (at step 205) and the value of the boom_up lever flag is 0 or the value of M3 is set to 'up' (at step 210), the controller 70 also proceeds to the processes of subroutine 3 (at step 225).

Figure 9:
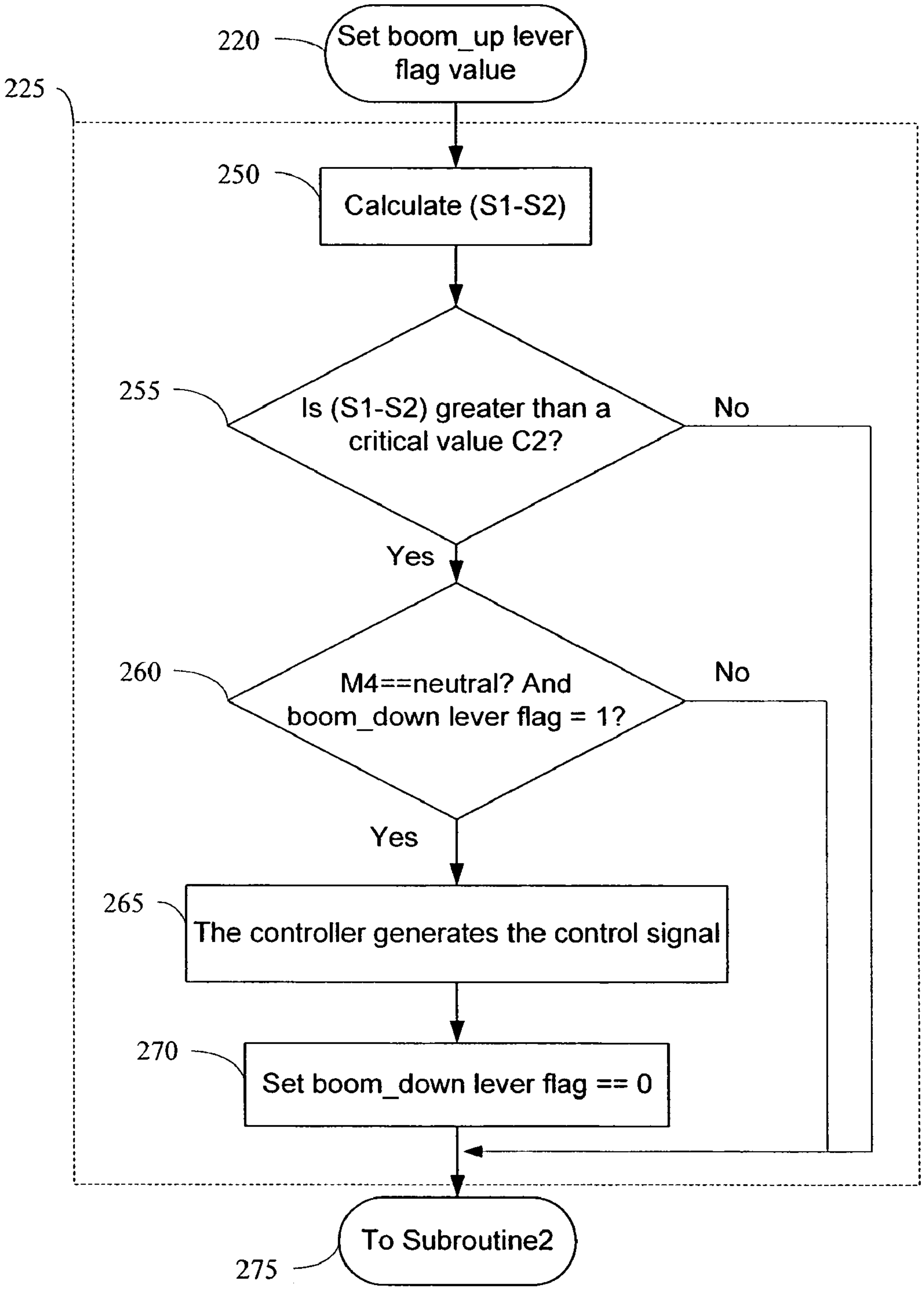
FIG. 9 is a flow chart illustrating processes to identify a second set of conditions related to boom oscillations.

After the controller 70 sets the value of the boom_up lever flag to 0 (at step 220) as illustrated in FIG. 9, the controller 70 subtracts S2 from S1 (at step 250) and compares the difference to C2 to identify case 2 (at step 255). The controller 70 checks the values of M4 and the boom_down lever flag (at step 260). The controller 70 generates the control signal (at step 265) when the values of M4 and the boom_down lever flag are 'neutral' and 1, respectively. The control signal generated by the controller 70 (at step 215 and step 265) takes into account the amount of time it takes the signal to reach the first and second controller valves 85 and 88 and the amount of time it takes for the controller valves to open and shut. The controller 70 sets the boom_down lever flag to 0 (at step 270), returns to subroutine 2 (at step 275), and subsequently to subroutine 1 (at step 230). Alternatively, when the conditions are not indicative of case 2 (at step 255), the controller 70 returns to subroutine 2. Additionally, when case 2 is identified (at step 255) and the value of the boom_down lever flag is 0 or the value of M4 is set to 'down' (at step 260), the controller 70 proceeds to subroutine 2 (at step 275).

For example, if the controller 70 reads the signal S3 (at step 150) and senses the operator manipulating the control lever 46 to the second position 76 (at step 155), the values of M3, boom_up lever flag, and boom_down level flag are set to 'up', 1, and 0, respectively (at step 160). Since the signal S3 indicates that the boom arm is up, the value of M4 is set to 'neutral' (at step 180). The controller 70 then senses signals S1 and S2 (at step 185), and subtracts S2 from S1 (at step 200) to identify case 1 (at step 205). The value of S1−S2 may not be less than C1 when the operator manipulates the control lever 46 to the second position 76. Thus, the controller 70 proceeds to the processes of subroutine 3 (at step 225). The controller 70 calculates S1−S2 (at step 250), and compares the difference to C2 (at step 255). If the conditions for case 2 are met (at step 255), the controller 70 checks whether the values of M4 and the boom_down lever flag are 'neutral' and 0, respectively (at step 260). The controller 70 proceeds to subroutine 2 (at step 275) and subsequently to subroutine 1 (at step 230) to sense signals S3 and S4 (at step 150).

In response to the operator stopping or reversing direction of the control lever 46, the controller 70 senses a very low or non existent signal S3 (at step 155), thereby setting the value of M3 to 'neutral' (at step 165). The controller 70 can carry out the operations described in FIGS. 6-9 at a relatively fast rate. Thus, the controller 70 sets the value of M4 to 'neutral' (at step 180). The operator stopping or reversing direction of the control lever 46 generates an excessive high pressure in the second chamber 52 and an excessive low pressure in the first chamber 49. The excessive low and high pressures reaching equilibrium causes boom oscillations. The controller 70 senses signals S1 and S2 (at step 185) and calculates S1−S2 (at step 200) to identifying case 1 (at step 205). The controller 70 also senses that the values of M3 and the boom_up lever flag are 'neutral' and 1, respectively (at step 210), thus generating the control signal (at step 215). The processes described in FIGS. 7-9 may repeat until the operator positions the on/off switch in the off position (at step 105), thereby disabling the operation of the control system 31.

Thus, the invention provides, among other things, a control system 31 coupled to a hydraulic system 28 operable to help predict and prevent boom oscillations. Various features of the embodiments are set forth in the following claims.

What is claimed is:

1. A working apparatus comprising:

a first source configured to provide pressurized hydraulic fluid;

an operator control unit;

a boom arm;

a boom cylinder configured to be coupled to the boom arm, the cylinder having a first chamber and a second chamber;

a main control valve configured to direct the pressurized hydraulic fluid from the first source to the first and second chambers in response to manipulation of the operator control unit to selectively raise and lower the arm;

a first pressure sensor and a second pressure sensor operable to detect hydraulic pressure in the first and second chambers, respectively, and generate a signal in reference to the amount of hydraulic pressure in the first and second chambers, respectively;

a controller valve operable in a parallel configuration with the operator control unit to override the operation of the control unit and manipulate the main control valve; and a controller operable to receive the signals from the pressure sensors, process the signals to predict boom oscillations, and control the controller valve to operate the main control valve and help prevent the predicted boom oscillations.

2. The working apparatus of claim 1, further comprising a second source configured to provide pressurized hydraulic fluid, and operable to communicate with the main control valve; the controller valve operable to communicate the second source and the main control valve; wherein the main control valve is operable to operate under the influence of the second source to direct hydraulic fluid from the first source into one of the first and second chambers.

3. The working apparatus of claim 2, wherein the operator control unit is operable to control the delivery of hydraulic fluid from the second source to the main control valve to control operation of the main control valve.

4. The working apparatus of claim 3, further comprising a control pressure sensor operable to detect pressure of hydraulic fluid between the second source and the main control valve, and to send a signal to the controller indicative of the sensed pressure.

5. The working apparatus of claim 4, wherein the controller is operable to receive the signal from the control pressure sensor, process the signal to predict boom oscillations, and send a control signal to the controller valve; and wherein the controller valve is operable to override the operator control unit and manipulate the main control valve to help prevent the predicted boom oscillations in response to receiving the control signal.

6. The working apparatus of claim 1, wherein the operator control unit includes a joystick unit; and the main control valve is operable to direct hydraulic fluid from the first source into one of the first and second chambers in response to manipulation of the joystick.

7. The working apparatus of claim 6, further comprising a sensor operable to detect a signal between the joystick and the main control valve, and send the signal to the controller indicative of the joystick controlling the main control valve; and wherein the controller is operable to receive the signals from the sensors, process the signals to predict boom oscillations, and override the joystick to manipulate the main control valve and help prevent the predicted boom oscillations.

8. A working apparatus comprising:

a first source of pressurized hydraulic fluid;

an operator control unit;

a boom arm;

a boom cylinder coupled to the boom arm, the cylinder having a first chamber and a second chamber;

a main control valve selectively directing pressurized hydraulic fluid from the first source to the first and second chambers in response to manipulation of the operator control unit to selectively raise and lower the arm;

a first pressure sensor and a second pressure sensor detecting hydraulic pressure in the first and second chambers, respectively, and generating signals in reference to the amount of hydraulic pressure in the first and second chambers, respectively;

a controller receiving the signals from the pressure sensors, processing the signals to monitor operation of the cylinder and arm, and generating a control signal when the signals are indicative of impending boom oscillations; and a controller valve overriding the operator control unit and manipulating the main control valve to help prevent boom oscillations in response to receiving the control signal.

9. The working apparatus of claim 8, further comprising a second source of pressurized hydraulic fluid communicating with the main control valve; wherein the operator control unit controls the delivery of hydraulic fluid from the second source to the main control valve to direct hydraulic fluid from the first source into one of the first and second chambers; and wherein the controller valve communicates the second source and the main control valve and selectively overrides the operator control unit to manipulate the operation of the main control valve and help prevent boom oscillations in response to receiving the control signal.

10. The working apparatus of claim 9, further comprising a control pressure sensor detecting hydraulic pressure between the operator control unit and the main control valve and sending signals to the controller in reference to the sensed pressure.

11. The working apparatus of claim 8, wherein the operator control unit includes a joystick unit; and wherein the main control valve selectively directs hydraulic fluid from the first source into one of the first and second chambers in response to manipulation of the joystick.

12. The working apparatus of claim 11, further comprising a sensor operable to detect signals between the joystick and the main control valve, and sending signals to the controller in reference to the joystick controlling the main control valve; and wherein the controller receives the signals from the sensors, process the signals to monitor the operation of the cylinder and arm, and overrides the operation of the joystick to manipulate the main control valve and help prevent boom oscillations in response to receiving the control signal.

13. A method for inhibiting boom oscillations in a working apparatus having a boom arm coupled to a boom cylinder having first and second chambers, a main control valve, and an operator control unit permitting an operator to manipulate the main control valve to direct hydraulic fluid into one of the first and second chambers to selectively raise and lower the arm, the method comprising:

(a) detecting pressure of hydraulic fluid in the first and second chambers of the boom cylinder;

(b) generating first and second signals indicative of the hydraulic pressure in the first and second chambers, respectively;

(c) comparing the first and second signals to parameters;

(d) predicting boom oscillations based on the comparison of step (c);

(e) generating a control signal in response to predicting boom oscillations; and (f) overriding operation of the control unit to manipulate the main control valve and help prevent predicted boom oscillations in response to creating the control signal.

14. The method of claim 13, further comprising: (g) detecting pressure of hydraulic fluid between the operator control unit and the main control valve; (h) generating a third signal indicative of the detected pressure in step (g); and (i) comparing the third signal to another parameter; wherein step (d) includes predicting boom oscillations based on the comparison of step (c) and based on the comparison of step (i).

15. The method of claim 13, wherein step (a) includes attaching a first chamber sensor and a second chamber sensor to the first and second chambers, respectively, to generate the first and second signals.

16. The method of claim 15, the working apparatus including a controller; wherein step (c) includes using the controller to compare the first and second signals to parameters; wherein step (d) includes using the controller to predict boom oscillations based on the comparison of step (c); and wherein step (e) includes using the controller to generate the control signal in response to predicting boom oscillations.

17. The method of claim 16, the working apparatus including a controller valve; wherein step (f) includes using the controller valve to override the operation of the control unit to manipulate the main control valve and help prevent predicted boom oscillations in response to receiving the control signal.

18. The method of claim 17, the working apparatus including a control pressure sensor; wherein step (g) includes using the control sensor to detect hydraulic pressure between the operator control unit and the main control valve; wherein step (h) includes using the control sensor to generate the third signal in reference to the detected pressure; and wherein step (i) includes using the controller to compare the third signal to another parameter.

19. The method of claim 14, further comprising: (j) presetting the parameters based on the type of working apparatus; and wherein step (c) includes comparing the first and second signals to the preset parameters.

20. The method of claim 19, further comprising: (k) presetting the another parameter based on the type of working apparatus; and wherein step (i) includes comparing the third signal to the another preset parameter.

21. A control for a working apparatus having an arm; the control comprising:

a controller operable to receive at least one signal from a first pressure sensor that is operable to detect a pressure in a first chamber of a boom cylinder, and at least one signal from a second pressure sensor that is operable to detect a pressure in a second chamber of the boom cylinder;

wherein the controller is operable to process the at least one signal from each of the first and second sensors, and to control a controller valve coupled in a parallel configuration to an operator control unit to help prevent oscillations of the arm.

22. The control of claim 21, wherein the controller is operable to compare the at least one signal from the first pressure sensor to the at least one signal from the second pressure sensor.

23. The control of claim 22, wherein the controller is operable to generate a control signal when the difference of the value of the at least one signal from the first pressure sensor and the value of the at least one signal from the second pressure sensor is less than a first parameter.

24. The control of claim 22, wherein the controller is operable to generate a control signal when the difference of the value of the at least one signal from the first pressure sensor and the value of the at least one signal from the second pressure sensor is greater than a second parameter.

25. The control of claim 21, wherein the controller is operable to receive at least one signal from a third pressure sensor configured to detect an operating condition of the operator control unit.

26. The control of claim 25, wherein the controller is operable to generate the control signal when the value of the at least one signal from the third pressure sensor is similar to a third parameter, and when the difference of the value of the at least one signal from the first pressure sensor and the value of the at least one signal from the second pressure sensor is less than a first parameter.

27. The control of claim 26, wherein the controller is operable to generate the control signal when the value of the at least one signal from the third pressure sensor is similar to a fourth parameter, and when the difference of the value of the at least one signal from the first pressure sensor and the value of the at least one signal from the second pressure sensor is greater than a second parameter.

28. A method for inhibiting arm oscillations in an apparatus having an arm, the method comprising:

generating a first signal indicative of pressure in a first chamber;

generating a second signal indicative of pressure in a second chamber;

comparing the first signal to the second signal;

predicting arm oscillations based on the comparison of the first signal to the second signal; and generating a control signal to override an operator control unit operable to control the arm in response to predicting the arm oscillations.

29. The method of claim 28, wherein comparing the first and second signals includes subtracting the value of the first signal from the value of the second signal.

30. The method of claim 28, wherein predicting arm oscillations includes at least one of predicting the arm oscillations when the difference of the value of the first signal and value of the second signal is less than the first parameter; and predicting the arm oscillations when the difference of the value of the first signal and the value of the second signal is greater than the second parameter.

31. The method of claim 28, further comprising generating a third signal indicative of an operating condition of the operator control unit; and predicting the arm oscillations is further based on the operating condition of the arm.

* * * * *